Figure 1:
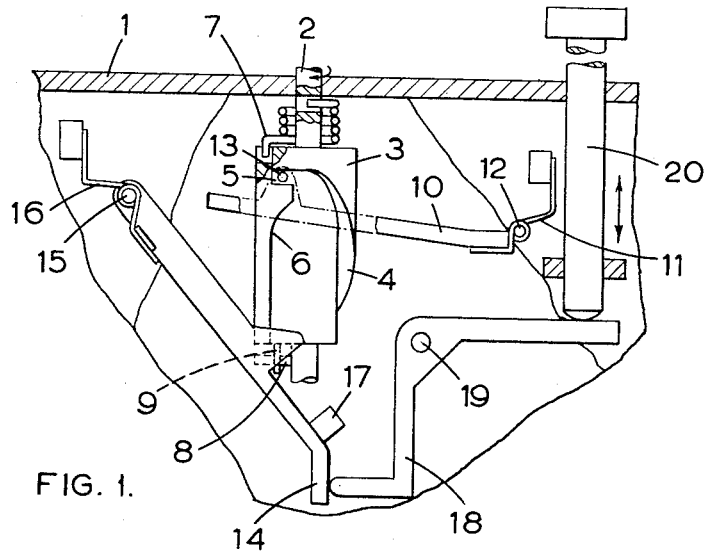

Aug. 29, 1961 G. HEERKLOTZ 2,997,934
SINGLE LENS REFLEX CAMERA
Filed Dec. 28, 1959 2 Sheets-Sheet 1

INVENTOR
GÜNTER HEERKLOTZ
BY Irwin S. Thompson
ATTY.

Aug. 29, 1961  G. HEERKLOTZ  2,997,934
SINGLE LENS REFLEX CAMERA
Filed Dec. 28, 1959  2 Sheets-Sheet 2

INVENTOR
GÜNTER HEERKLOTZ
BY Irwin S. Thompson
ATTY.

United States Patent Office 2,997,934
Patented Aug. 29, 1961

2,997,934
SINGLE LENS REFLEX CAMERA
Günter Heerklotz, Dresden, Germany, assignor to VEB Kamera- und Kinowerke Dresden, Dresden, Germany
Filed Dec. 28, 1959, Ser. No. 862,215
3 Claims. (Cl. 95—42)

The invention relates to a single lens reflex camera, in which a control cam coupled to the winding mechanism of the camera is provided for the mirror mechanism, which at the same time influences the movement of the mirror swinging back into its initial position.

Control of the mirror mechanism by cams is known. In order to prevent rebouncing of the mirror into the path of the light rays after release of the shutter, additional elements, such as spring pockets, buffer springs, buffer levers, etc., have, however, become necessary, in order to arrest the mirror in its top position. Other arrangements equally known, in which rebouncing of the mirror is prevented by the system of mirror control itself, have the disadvantage of requiring far more complicated elements.

These disadvantages are eliminated by the present invention, which offers further advantages in that an arresting lug is provided at the end of the curved path of the control cam coupled to the winding mechanism of the camera, onto which a bolt or cam follower, transmitting the cam movement to the mirror and attached to the mirror, is located prior to the beginning of the movement of the mirror. The winding spindle for the mirror is coupled to the control cam in the winding direction via a stop, into the path of which a carrier pin connected to the control cam projects. The bolt attached to the mirror runs along the curved path during the rotation of the mirror winding axis and is locked, after reaching the focussing position, by releasable latch means in the form of a support arm connected to the release mechanism of the camera. The winding axis and the control cam, coupled to it by elastic means, e.g. a torsional spring, are then returned to their initial position, in which the arresting lug is within the range of movement of the bolt attached to the mirror. Releasing the camera also unlocks the mirror, which will as well be returned by spring pressure to its initial position, while the mirror bolt slides along a slide area on the cam. As the control cam is coupled to the winding axis in the winding direction by elastic means, e.g. by a torsional spring with ends fixed to the control cam and the winding axis respectively, the control cam will give way to the pressure of the mirror bolt against the arresting lug. A braking effect is thereby exercised upon the mirror movement, and rebouncing of the mirror is prevented by the mirror bolt clicking in at the arresting lug.

A further development of the present invention provides for elastic support of the arresting lug on the control cam.

A more detailed description of the invention is given with the aid of an example. All details not directly connected with the invention have been left out.

Figure 2:
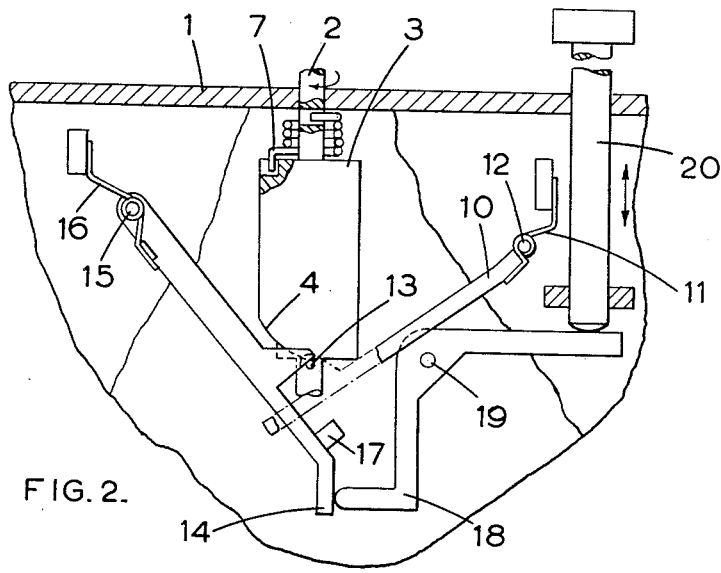
Figure 3:
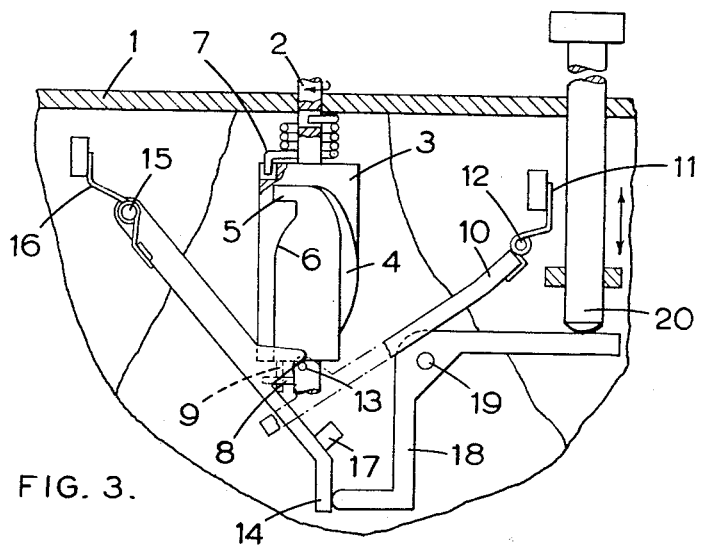
Figure 4:
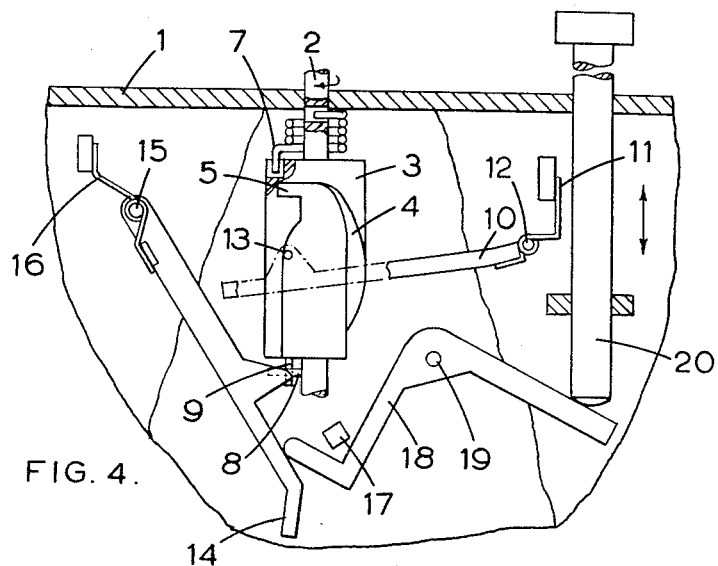

FIGURE 1 shows mirror and control cam in their initial position;
FIGURE 2 shows mirror and control cam after winding;
FIGURE 3 shows the control cam returned into its initial position;
FIGURE 4 shows the mirror in an intermediate position during its movement.

A winding spindle 2, carrying a control cam 3 is supported in the camera housing 1. This control cam 3 has a curved path 4, leading at one end to an arresting lug 5, as well as a slide area 6 to the arresting lug 5. Elastic coupling of the winding spindle 2 and the control cam 3 is by means of a torsional spring 7. The winding axis 2 has furthermore a stop 8, abutting against a carrier pin 9 of the control cam 3. The mirror 10, swinging around the axis 12 against the pressure of the spring 11, carries a bolt or cam follower 13 connected to the control cam 3. The mirror 10 is held in its lower position by a support lever 14, swinging around a bolt 15 against the pressure of the spring 16, and which rests on a stop 17. The support lever 14 is connected to the camera release 20 via a bell-crank lever 18, swinging around its supporting bolt 19.

The mechanism operates in the following manner:

Prior to the beginning of the winding movement, the bolt 13 of the mirror 10 is located on the arresting lug 5 of the control cam 3 (FIGURE 1). When rotated in the winding direction, the winding spindle 2 will drive via a stop 8 the carrier pin 9 lying in its path, as well as the control cam 3. Bolt 13 of mirror 10 is thereby moved downwards along the curved path 4, and the mirror 10 is moved into the focussing position, where it is retained by a support lever 14 (FIGURE 2). The winding spindle 2 returns into its initial position. The control cam 3 follows this movement under the influence of the torsional spring 7 (FIGURE 3). In this position the arresting lug 5 will be within the movement range of the mirror bolt 13.

By operating the camera release 20, the bell-crank lever 18 will be rotated, so as to press the support lever 14 away from the stop 17. The mirror bolt 13 is thereby released by the support lever 14, and the mirror 10 is moved upwards by the spring 11, while the bolt 13 slides along the slide area 6 towards the arresting lug 5 (FIGURE 4), and the control cam 3 is rotated relative to the winding spindle 2 against the pressure of spring 7 in the winding direction. This will have a braking effect upon the movement of the mirror 10. In the course of this movement the mirror bolt will click in at the arresting lug 5 and thus prevent rebouncing of the mirror into the path of the light rays.

I claim:
1. A single lens reflex camera comprising a housing, a camera shutter arranged within said housing, a film winding spindle rotatably mounted in said housing, a cam rotatably mounted on said winding spindle, a first spring drivably connecting said cam to said spindle, a mirror pivotally mounted in said housing, and capable of movement into and out of the optical path of the camera, a second spring connected to said mirror urging the latter out of the optical path of the camera, a cam follower attached to said mirror being in engagement with said cam for displacing the mirror into the optical path of the camera on rotation of the film winding spindle against the action of said second spring, latch means arranged in said housing for locking said cam follower when the mirror is in the optical path of the camera, release means arranged within said housing for releasing said cam follower from said latch means when the camera shutter is operated, and an arresting lug on said cam for arresting said cam follower in a position out of the optical path when the mirror is moved out of the optical path under the action of the second spring.

2. A single lens reflex camera according to claim 1, wherein said latch means are provided by a spring loaded support arm having a projecting latch formed thereon.

3. A single lens reflex camera according to claim 2, wherein said release means are provided by a bell crank lever arranged in said housing to be capable of displacing said spring loaded support arm to release said latch.

References Cited in the file of this patent
UNITED STATES PATENTS 2,552,275    Harvey _____ May 8, 1951
2,608,921    Studdert _____ Sept. 2, 1952